US012773795B2

(12) United States Patent
Whaley

(10) Patent No.: US 12,773,795 B2
(45) Date of Patent: Oct. 27, 2026

(54) WHEEL PAIR FOR A STABLE MECHANISM TO PROPEL A MATING CONCAVE SPHERICAL SURFACE ALONG TWO AXES OF ROTATION

(71) Applicant: Winsten William Whaley, New Braunfels, TX (US)

(72) Inventor: Winsten William Whaley, New Braunfels, TX (US)

( * ) Notice: Subject to any disclaimer, the term of this patent is extended or adjusted under 35 U.S.C. 154(b) by 108 days.

(21) Appl. No.: 18/908,570

(22) Filed: Oct. 7, 2024

(65) Prior Publication Data

US 2026/0097527 A1 Apr. 9, 2026

(51) Int. Cl.

| | |
|---|---|
| ***B25J 17/00*** | (2006.01) |
| ***B25J 9/06*** | (2006.01) |
| ***B25J 17/02*** | (2006.01) |

(52) U.S. Cl.

CPC ............. *B25J 17/0275* (2013.01); *B25J 9/06* (2013.01)

(58) Field of Classification Search

CPC . B25J 17/0275; B25J 9/06; B25J 9/065; B25J 9/104; B25J 17/02; B25J 18/06

See application file for complete search history.

(56) References Cited

U.S. PATENT DOCUMENTS

| | | | | |
|---|---|---|---|---|
| 3,357,210 A * | 12/1967 | Dean, II | F16D 3/24 | 464/124 |
| 3,973,469 A * | 8/1976 | Humen | F01C 3/06 | 91/196 |
| 4,045,958 A * | 9/1977 | Wells | B25J 17/0275 | 92/120 |
| 4,194,437 A * | 3/1980 | Rosheim | B25J 17/0275 | 92/120 |
| 2001/0046901 A1* | 11/2001 | Meyer | F16D 3/2245 | 464/145 |
| 2007/0060399 A1* | 3/2007 | Feichter | F16D 3/227 | 464/146 |
| 2009/0038421 A1* | 2/2009 | Wilson | B62D 57/032 | 74/33 |

FOREIGN PATENT DOCUMENTS

| | | | | |
|---|---|---|---|---|
| CN | 110462944 A * | 11/2019 | H01R 35/04 | |
| FR | 2525306 A1 * | 10/1983 | F16C 19/502 | |

* cited by examiner

*Primary Examiner* — Zakaria Elahmadi

(57) ABSTRACT

A wheel pair for a stable mechanism to propel a mating concave spherical surface, each wheel having a center part rotatable around an axis and a plurality of surface engaging parts rotatably mounted on the center part about the periphery thereof. Each of the concave surface engaging parts is a roll having its surface convexly vaulted in longitudinal direction and being mounted with its axis extending obliquely with respect to the axis of rotation of the center part. The angle between the axis of the rolls and the axis of rotation, along with the specific convex profile of the roll are selected so that the rolls make suitable and unbroken contact with the mating spherical surface.

4 Claims, 6 Drawing Sheets

Wheel Pair with Concave Spherical Drive Surface

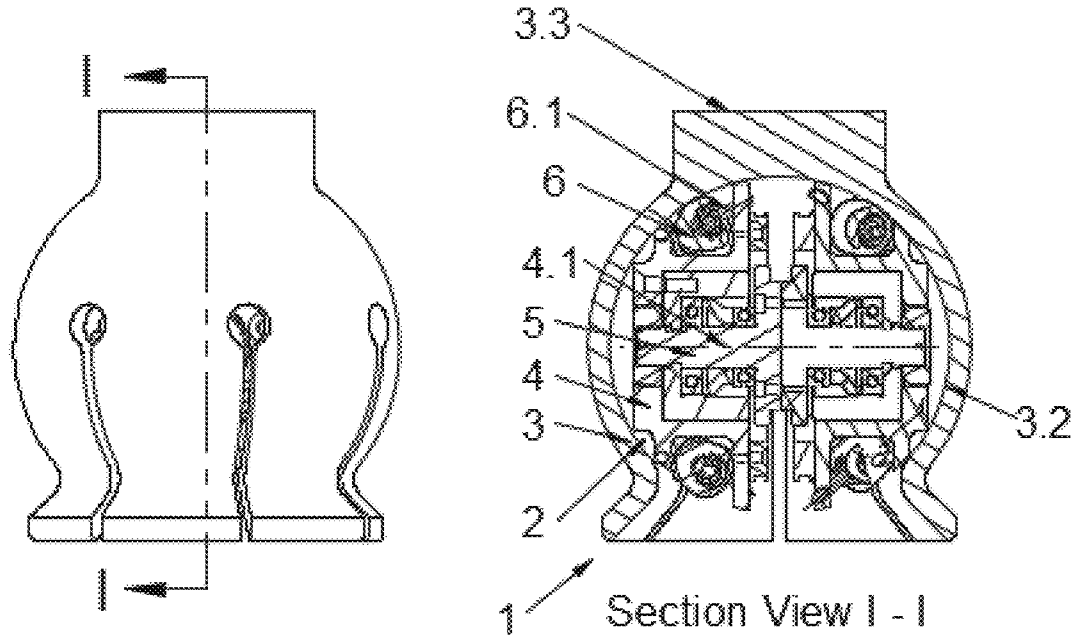
Fig. 1 - Section View

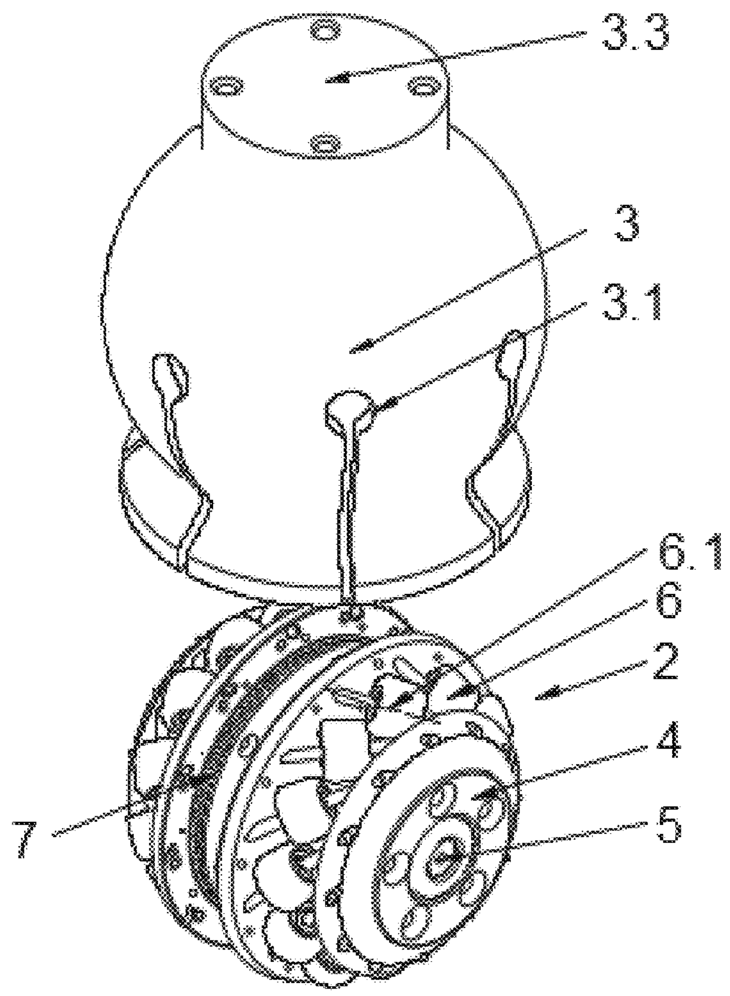
Fig. 2 - Wheel Pair with Concave Spherical Drive Surface

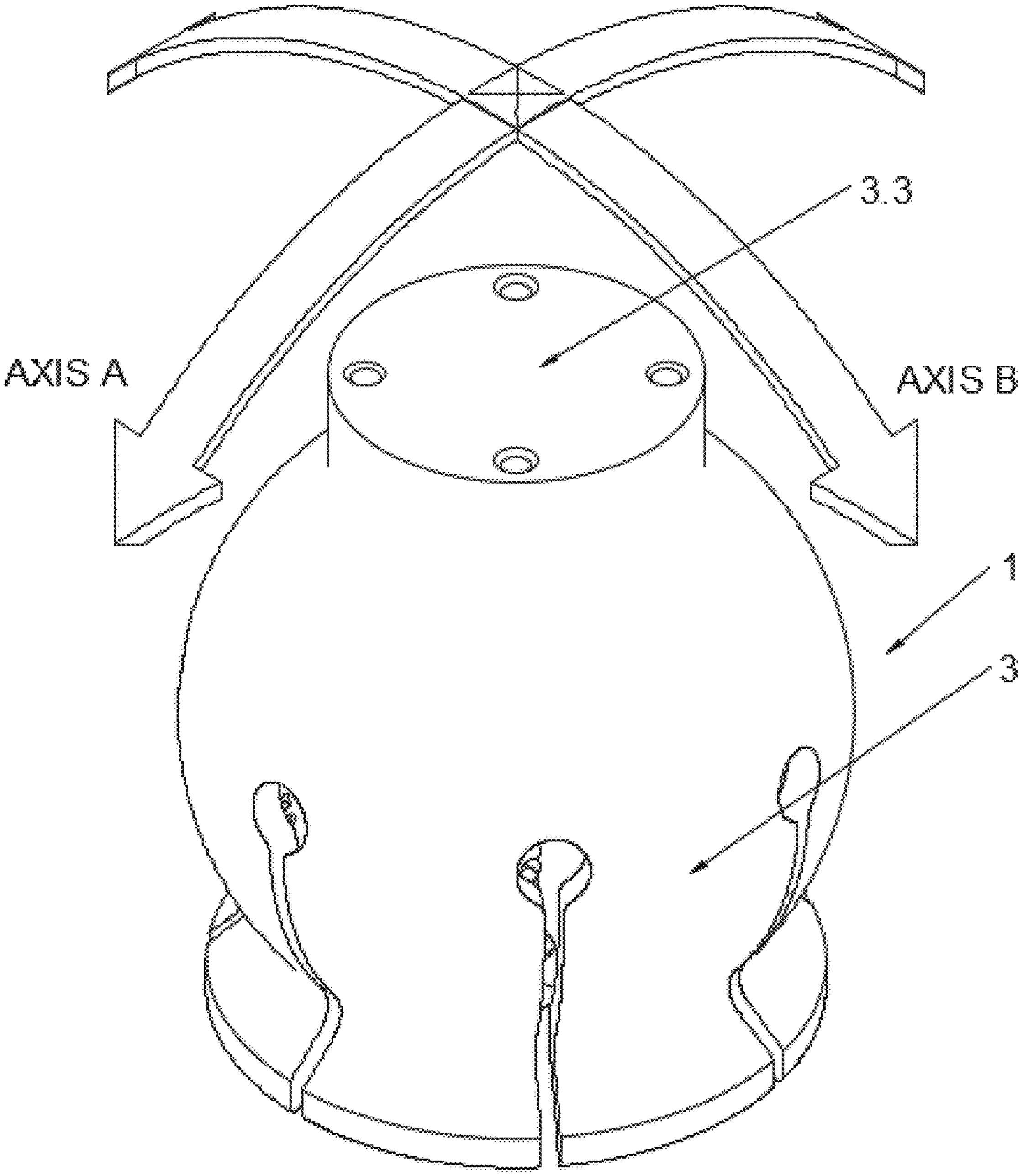
Fig. 3 - Controlled Axes

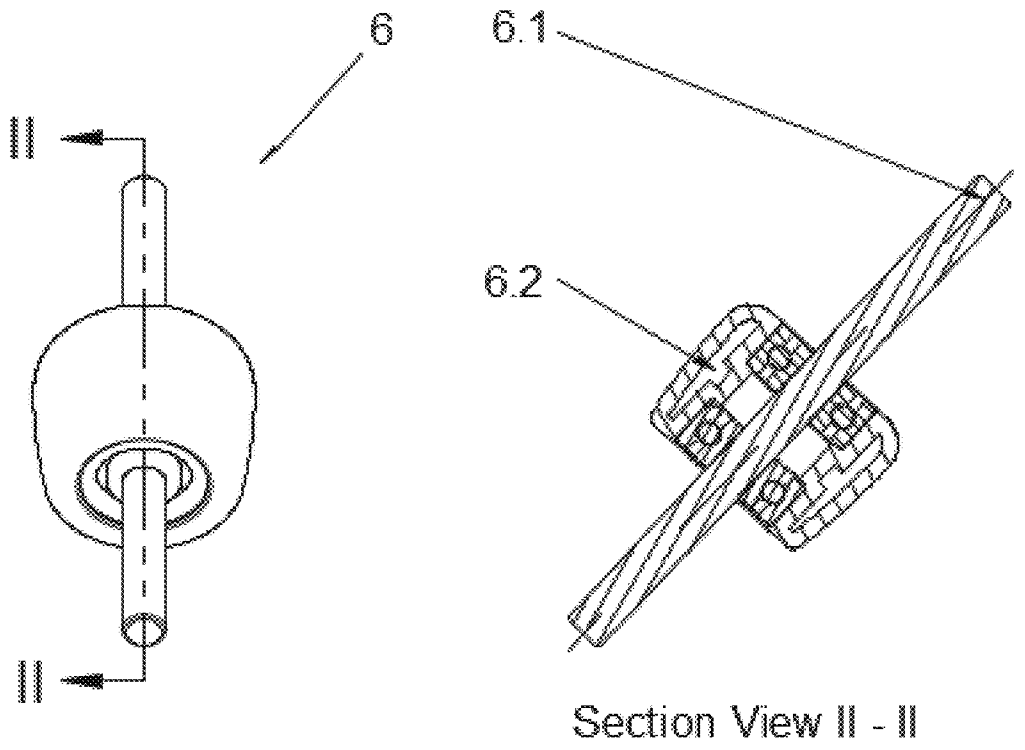
Fig. 4 - Section View, Individual Roller Assembly

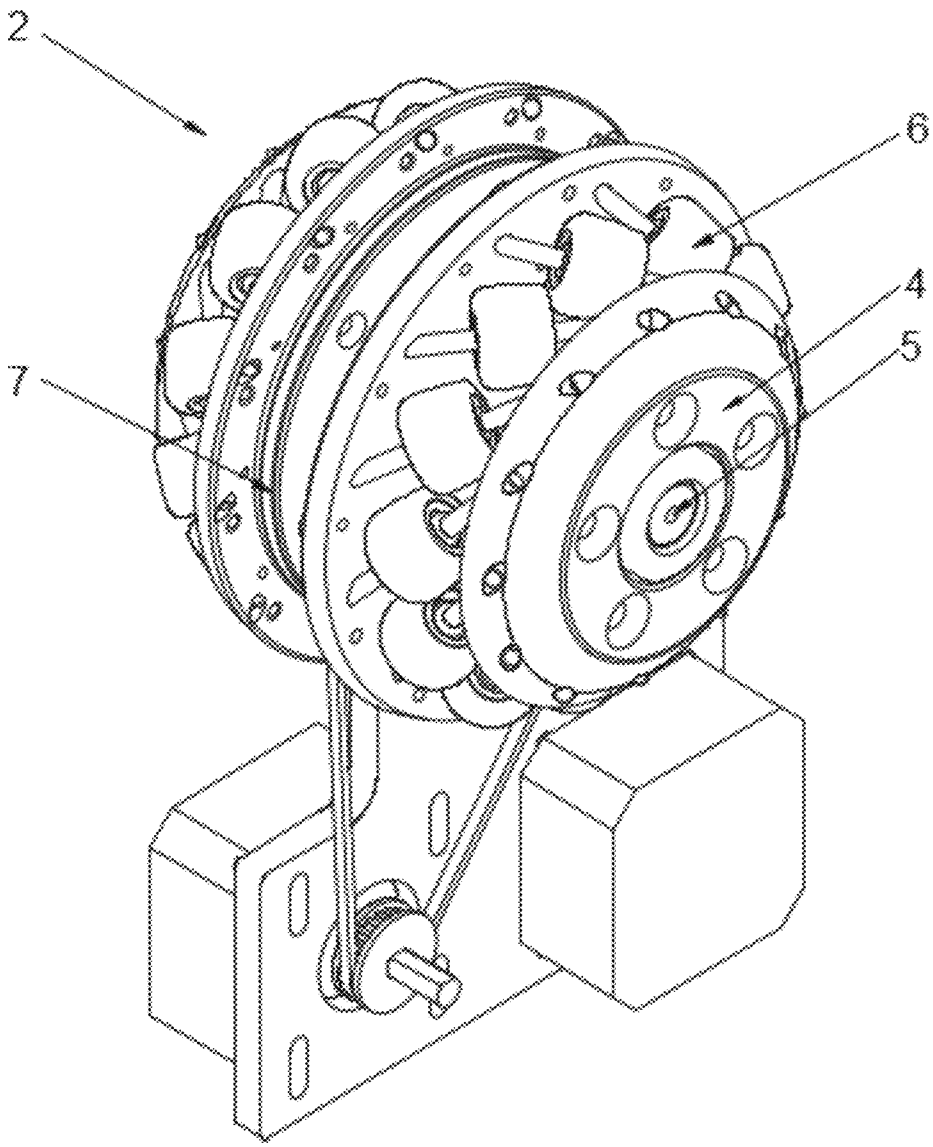
Fig. 5 - Externally Powered Wheel Pair Example

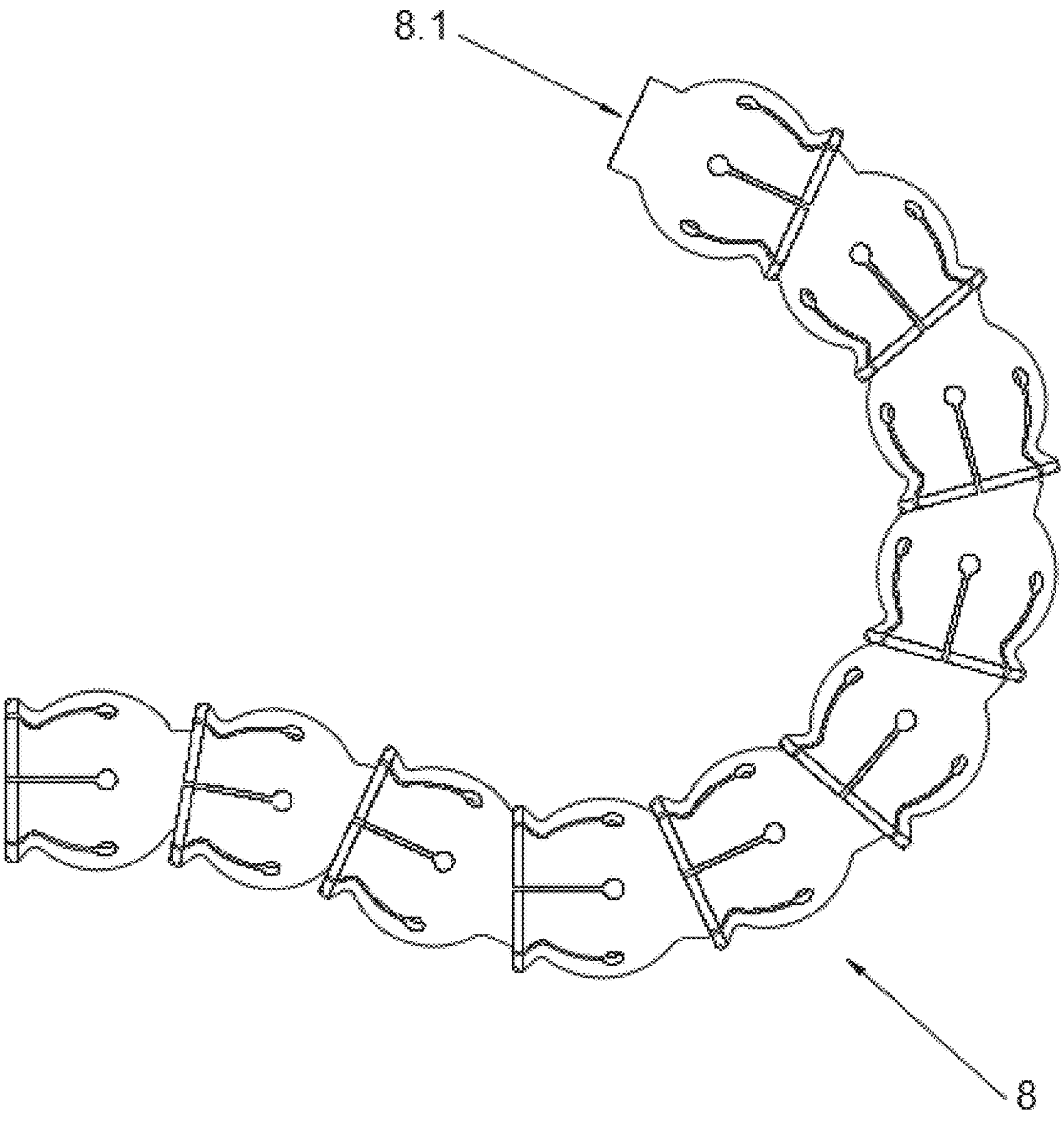
Fig. 6 Robotic Arm or Tail Assembly

WHEEL PAIR FOR A STABLE MECHANISM TO PROPEL A MATING CONCAVE SPHERICAL SURFACE ALONG TWO AXES OF ROTATION

BACKGROUND OF THE INVENTION

The present invention relates to improvements in motion control joints for robotics, specifically joints enabling movement with two degrees of freedom about the two principal angular axes in a spherical coordinate system, whereby each wheel in the pair is individually powered and includes a center part disposed on a center axis which includes several mating surface engaging parts, which are rotatably mounted on the center part and distributed around the same.

To drive spherical joints used in robotics, it is previously known to apply external linear actuators to an otherwise inert ball and socket joint, or use a spherical gear driven by a pair of rotationally articulating pinion gears with a matching spherical profile. For the methods utilizing external linear actuators, generally three to four actuators are employed to provide two degrees of freedom. The actuators can present challenges due limited range of motion along the two available axes as well as being exposed, and prone to damage in non-ideal environments. The more recent development of the spherical gear improves the enabled control for the joint, allowing for three degrees of freedom and an improvement to the range of motion within those degrees of freedom. The spherical gear method requires the use of two motors per pinion gear, one to rotate the gear itself and one to rotate the shaft the gear is mounted to, perpendicular to the axis of rotation of the gear, for a total of four motors to achieve the intended motion. As an additional note, at the time of submission of this document, the spherical gear method is not widely employed in robotics and as the technology matures, additional limitations may be observed. One possible limitation is that in an overload event, damage may occur to the gear profile of the sphere or the pinion gears, effectively eliminating functionality of the joint.

The purpose of the present invention is to reduce the complexity of the spherical joint applied in robotics in terms of actuator control, while improving its range of motion and providing a reduction in exposed components over the most commonly applied methods.

DESCRIPTION OF VIEWS

The invention is described in further detail with reference to the included drawings illustrating an embodiment of the wheel, with an example of a simple provision to drive the wheel.

FIG. 1 is a sectioned view of the mechanism, displaying one example embodiment of the proposed design.

FIG. 2 is an isometric drawing of the mechanism depicted in FIG. 1, with the external spherical surface removed to detail an example embodiment of the proposed design in three dimensions.

FIG. 3 is an isometric drawing of the mechanism depicted in FIG. 1, with overlaid arrows indicating the available directions of travel for the mechanism.

FIG. 4 is an isolated section view of one of the mating spherical surface engaging parts installed on a simple axle, displaying an example embodiment of the roll where it is constructed with hollow geometry.

FIG. 5 is an isometric view of the mechanism depicted in FIG. 1, without the mating spherical surface, detailing an example embodiment of the design that contains provisions for externally powering the rotary motion of each wheel independently.

FIG. 6 is a view of a plurality of the mechanism arranged into a robot arm or tail configuration that could be used for improving dynamic stability, or for mounting one or more end effectors along the length or at its distal end.

DETAILED DESCRIPTION OF THE INVENTION

For the purposes enumerated in the background of the invention, the invention is essentially characterized in that each of the mating surface engaging parts has the shape of a roll, with the outer side convexly vaulted in the longitudinal direction thereof whereby each roll is disposed on the center part having the longitudinal center axis thereof transversely disposed in relation to the center axis of the center part, whereby the distance at which the rolls are disposed in relation to the center axis as well as the oblique angle the rolls are set at relative to the center axis of the center part is selected along with the specific curvature of the outer side of the rolls to provide continuous contact and positive traction with the internal profile of the mating concave spherical surface.

In order to obtain smooth motion and improve traction, it is preferable that the rolls are formed from an elastic material. To improve the elasticity of the rolls, the internal geometry of the rolls may be modified with hollow sections, or channels running parallel to the center axis thereof.

Finally, in order to improve traction or load handling, the center part may be modified to carry suspension elements, either added on or as built-in compliant mechanisms to add or modulate preload applied through the rolls to the mating concave spherical surface.

SUMMARY OF THE INVENTION

By propelling a concave spherical surface, the wheel pair can power a joint with an output shaft located on the exterior surfaced of the body with the concave spherical surface. By employing the invention described above, a joint can be constructed that obtains high traction, reliability, and a large range of motion.

To drive this particular version of a spherical joint in the two principal spherical coordinate axes described in FIG. 3, it is essential to mount the wheels to rotate individually and journalled in the bearings and furthermore it is required that the pair of wheels may be rotated in different directions in relation to each other and at different rates of rotation.

In order to drive the mating spherical surface to rotate about "Axis A" as defined in FIG. 3, which is the rotational axis parallel with the center axis of the center part of the wheels, both wheels are driven in the same direction at the same rate. In order to drive the mating spherical surface to rotate about "Axis B" as defined in FIG. 3, which is the rotational axis perpendicular with the center axis of the center part of the wheels, each wheel is driven in the opposite direction as the other wheel at the same rate.

The directions of rotation of and/or the rate of rotation of the wheels in the pair may also be individually adjusted to obtain combined motion along axes "A" and "B" as defined by FIG. 3. In other words, the end point of an output shaft of fixed length attached to the outside of the driven mating concave spherical surface could be driven to any coordinate on a theoretical sphere with a radius defined by the distance from the center-point (origin) of the driven surface's spherical rotation to the end point of the output shaft, within the range of motion of the joint.

FIG. 1 illustrates an embodiment of the mechanism generally designated by reference numeral 1 and intended to rotate the mating spherical surface 3 in the described manner. The pair of wheels generally indicated by the reference numeral 2 are rotatably mounted in a manner known per se on a fixed center axle 5 which is contained within the mating spherical surface 3. Each of the wheels 2 contains features or a subcomponent with features to carry parts for engaging the mating spherical surface. A number of mating spherical surface engaging parts 6 are distributed around the wheel 2 or the aforementioned wheel subcomponent 4. Each of the mating spherical surface engaging parts 6 is disposed on a pivotaxis 6.1 whose location is defined by the wheel 2 or wheel subcomponent 4, and makes contact with the mating spherical surface along the inner face 3.2 in order to position the output shaft 3.3.

The invention, providing motion from within the spherical joint, reduces the exposure of the means of propelling the joint, improving reliability in situations that may result in damage to other types of systems. An additional benefit of using traction as a propulsion method instead of linear actuators or a gear-train type system may be seen in the event of an overload or misuse. The resulting misalignment can be rectified through a re-calibration and continued service, without damage to the driving elements, such as a bent linear actuator rod or a stripped gear profile as may occur with existing solutions in industry.

What is claimed is:

1. A spherical joint for use in motion control systems, The spherical joint comprising: a pair of coaxially mounted wheels (2) and a mating concave spherical surface (3)

Wherein each wheel includes a center part (4) rotatably mounted on a center axis (5), and a plurality of rolls for engaging the mating concave spherical surface (3), wherein the plurality of rolls are rotatably mounted on the center part (4) and distributed around the center part wherein each roll (6) has convex outer side engaging the concave spherical surface wherein each roll (6) has a longitudinal axis (6.1) obliquely positioned in relation to the center axis (4.1) of the center part (4), wherein the rolls (6) are disposed at a selected distance in relation to the center axis of the center part, and with a specific curvature of the outer side of the rolls to provide continuous contact and positive traction with the internal profile of the mating concave spherical surface, Wherein the mating concave spherical surface (3) rotates about a first axis, which is the rotational axis parallel with the center axis of the center part of the wheels (2), when both wheels are driven in the same direction at the same rate, Wherein the mating concave spherical surface (3) rotates a second axis, which is the rotational axis perpendicular with the center axis of the center part of the wheels, when each wheel is driven in the opposite direction at the same rate.

2. A spherical joint according to claim 1, wherein each roll (6) is made from an elastic material.

3. A device according to claim 1, wherein the center part (4) carry suspension element to add preload applied through the rolls to the mating concave spherical surface (3).

4. A system comprising a plurality of spherical joints according to claim 1, joined to each other in series via the output shaft (3.3) in order to form an articulated robotic arm or tail (8).

* * * * *